UNITED STATES PATENT OFFICE.

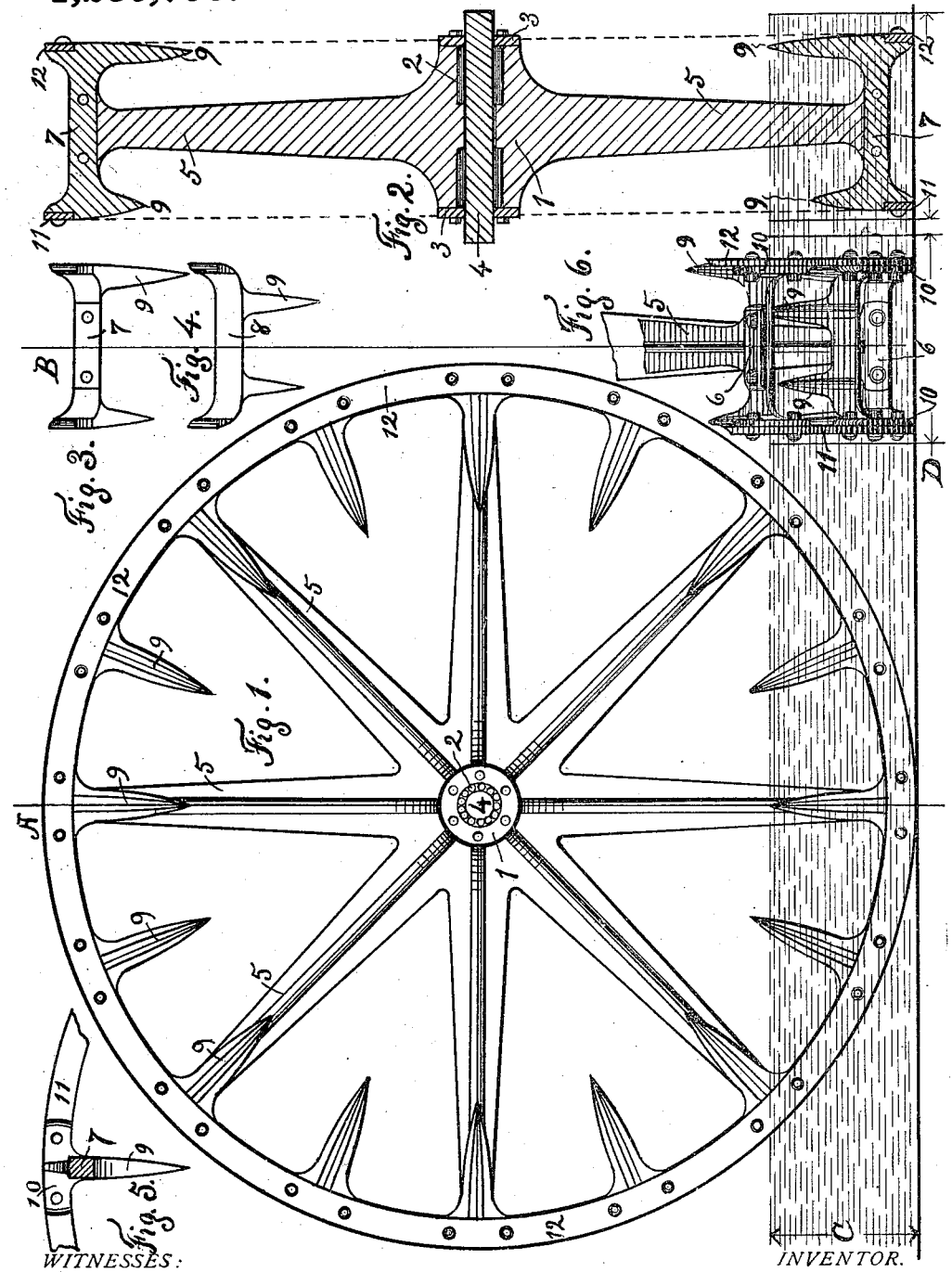

CHARLES E. SACKETT, OF DANBURY, CONNECTICUT.

SOIL-PULVERIZING WHEEL.

1,230,793.  Specification of Letters Patent.  Patented June 19, 1917.

Application filed March 29, 1917. Serial No. 158,152.

*To all whom it may concern:*

Be it known that I, CHARLES E. SACKETT, a citizen of the United States, residing at Danbury, in the county of Fairfield and State of Connecticut, have invented a new and useful Improvement in Soil-Pulverizing Wheels, of which the following is a specification.

This invention is used more especially in connection with agricultural implements designed to plow, pulverize and seed, the land in one passage over it. It is practically a vertical harrow, which continuously presents a succession of teeth pointing upward from the bed of the furrow, to receive and pulverize the soil turned over upon them by the plow, thereby handling the soil from the bed of the furrow upward, by a tossing process similar to hand-forking of garden soils.

The process exposes all the soil to light and air, and is a great improvement over surface harrowing implements, which operate from the surface downward by weight and compression, and which penetrate the soil with difficulty.

The object of this invention, is an improvement in construction of the pulverizing wheels shown in the following United States patents which have been issued to me, No. 220,176 and No. 220,177, both dated September 30, 1879; No. 222,603, dated December 16, 1879; No. 233,809, dated October 26, 1880; No. 238,970, dated March 15, 1881; No. 279,818 and No. 279,819, both dated June 19, 1883; and No. 1,211,241, dated January 2, 1917.

The construction of pulverizing-wheel embodied in the above patents is fully described in U. S. Patent No. 233,809, dated October 26, 1880; see Figure 7. and detail Fig. 8.

No improvement on that construction has been made in the art of record from that date up to and including Patent No. 1,211,241, dated January 2, 1917.

The construction shown in Patent No. 233,809 may be described as follows: The exterior or furrow side of the pulverizing-wheel was in the form of a truncated cone; the hub of the wheel furnished no support for the tread of the wheel, except by spokes radiating obliquely from the end of the hub forming the apex of the cone, the terminus of said spokes was joined to the outside rim of the tread of the wheel; the inside rim had no support except from lateral cross-bars forming the tread of the wheel and which were joined to the outside rim at one end; the pulverizing teeth were joined to the rims of the wheel.

Obviously the construction had many structural weaknesses; it was adopted on the theory that the inside body of the wheel should be hollow, and offer as little obstruction as possible to the free entry of the soil, turned into the wheel by the plow.

The construction of wheel shown in this invention is opposed to that theory, and is based on the fact that the extremities of the spokes of the wheel are moving rearwardly past the plow mold-board much faster than the hub of the wheel or the plow is moving forward, consequently they should be placed in the body of the wheel as well as the teeth, and thus aid to push the soil rearwardly away from the plow mold-board faster than it is delivering it, thus keeping the action of the mold-board free and clear; in this construction the furrow side of the wheel is left entirely open and unobstructed (it was obstructed by the spokes of the old wheel), so that stones, or any undue accumulation of soil, can pass out freely on the furrow side, and clogging, except in soil too wet to disintegrate be made practically impossible.

The construction of wheel used in this invention is described as follows:

*Drawings.*—Fig. 1, is a side elevation of the improved soil pulverizing-wheel; Fig. 2, is a vertical section on line A of Fig. 1; Figs. 3 and 4, are alternate tread cross-bars with teeth attached; Fig. 5, is a middle cross-section of said cross-bars, on line B of Fig. 3; the flanged ends are shown riveted to the vertical side rims of the wheel; Fig. 6, shows a working section of the wheel submerged in the furrow; the depth of furrow is shown at line C; the width of furrow at line D.

1, is the hub of the wheel; 2, are roller-bearings for which the hub is recessed; 3, are the hub end-plates for retaining the roller-bearings, as shown in the vertical section; 4, is the axle; 5, are the spokes radiating perpendicularly from the hub midway of its length; 6, is the T-shaped termination of the spokes riveted to the tread of the wheel as shown in Fig. 6; 7 and 8, are the cross-bars to which the spokes are riveted midway of their length; 9, are the teeth or prongs which are cast with or joined to the cross-bars in irregular progression; 10, are the end flanges of the cross-bars which are riveted to the rims as shown in Figs. 4 and 5; the cross-bars are spaced at suitable distances as shown in Fig. 1, to allow the free discharge of the pulverized soil between them rearwardly to fill the furrow; 11, is the inner, and 12, the outer vertical steel bar rims, which with the cross-bars and teeth form the pulverizing-tread of the wheel. The cross-bars are shaped to allow a space below them to roll down and pass over the sod, weeds, or stubble stripped from the land, and turned before the wheel by a plow adapted for that purpose, thus leaving only cleared soil to be turned into the wheel; the vertical bar rims are designed to cut through this bed of sod or weeds, so as not to raise the wheel substantially much above the bed of the furrow.

Both the inner and outer side spaces of the wheel inclosed by the circumferential rims and cross-bars are open; this allows stones or any excess accumulation of soil to pass freely out of the wheel on the furrow side, and prevents clogging. In the old construction of wheel, the furrow side was closed by the oblique spokes forming the truncated cone on that side of the wheel.

By reference to applicant's previous patents, it will be seen there is a roller following the pulverizing-wheel which reduces any soil passing out of the furrow side of the wheel to the field level of the finished furrows.

Having thus described my invention what I claim as new, and desire to secure by Letters Patent is:

1. In a soil pulverizing-wheel, the combination of a hub, said hub being adapted to receive an axle contacting with roller bearings; a series of spokes joined to said hub midway of its length; said spokes radiating perpendicularly to the axial center of said hub, the extremities of said spokes being substantially joined to cross-bars midway of the length of said cross-bars; the ends of said cross-bars being flanged, and substantially joined to inner and outer vertical steel bar rims curved vertically to form the circumferential tires of said wheel, said rims and cross-bars forming the tread of said wheel; said cross-bars being constructed with teeth or prongs projecting internally into the body of said wheel in a direction radial to its axial center; said cross-bars and teeth being spaced at suitable distances between said rims to discharge the pulverized soil freely, said teeth or prongs being attached to alternate cross-bars in irregular progression; said pulverizing-wheel having unobstructed open spaces at each side of the spokes of said wheel, said spaces being inclosed circumferentially by the rims and cross-bars forming the tread of said wheel, said open spaces being penetrated internally a suitable distance by the teeth or prongs attached to the tread of said wheel; substantially as described and shown.

2. A soil pulverizing wheel forming a vertical harrow, the hub of said wheel revolving upon a horizontal axis, the spokes of said wheel radiating from said hub perpendicular to said axis, said spokes joining said hub midway of its length, a circumferential tread to said pulverizing wheel actuated by said spokes, said tread consisting of side rims joined by cross bars, said cross bars being joined to the termination of said spokes midway of their length, teeth or prongs erected upon said cross bars penetrating the interior of said pulverizing wheel a suitable length in a direction radial to its axis, said cross bars and teeth being submerged progressively by the revolutions of said wheel below the soil turned into said wheel for pulverization, at which times said teeth or prongs are upturned in the bed of a furrow to receive and penetrate said soil.

In testimony whereof, I, CHARLES E. SACKETT, have signed my name to this specification in the presence of two subscribing witnesses, this 27th day of March, 1917.

CHARLES E. SACKETT.

Witnesses:
S. E. STEVEN,
B. A. WORDEMANN.